United States Patent Office 3,006,936
Patented Oct. 31, 1961

3,006,936
POLYESTERS FROM EPOXY-CONTAINING OLEAGINOUS MATERIALS AND PROCESS OF MAKING SAME
Thomas W. Findley, La Grange, Ill., John L. Ohlson, Bedford, Mass., and Frank E. Kuester, La Grange, Ill., assignors to Swift & Company, Chicago, Ill., a corporation of Illinois
No Drawing. Filed Apr. 10, 1957, Ser. No. 651,821
5 Claims. (Cl. 260—406)

This invention relates to new organic polymeric materials derived from oxirane-containing fatty materials and to the preparation of such polymeric materials. More particularly, this invention relates to polyesters prepared from epoxy-containing fatty materials and dibasic acids, polybasic acids or anhydrides thereof. The polymers of this invention are useful as substitutes for rubber or as additives to natural or synthetic rubber, as molding compositions or as casting and laminating resins.

An object of this invention is to provide new and useful compositions of matter.

Another object is to provide a method of preparing new polymeric compositions from epoxy-containing oleaginous compositions.

Other objects, if not specifically set forth herein, will be apparent to one skilled in the art from the following detailed description of the invention.

In general, the present invention comprises the production of new polymeric materials by scission of the epoxy ring in epoxy fatty compositions. Scission of the epoxy configuration and formation of polyester compositions is effected by gently heating a stoichiometric amount of a dibasic acid or polybasic acid or anhydrides of dibasic or polybasic acids in the presence of an epoxy-containing oleaginous material. The characteristics of the polymer formed will depend upon the epoxy content of the fatty material and also on the particular agent employed to break the oxirane ring. Both soluble and cross-linked polymers may be formed in accordance with this invention depending upon the reactants.

In a more specific application of the present invention, an epoxidized fatty material such as epoxidized soybean oil may be heated gently with a stoichiometric amount of an organic dicarboxylic acid or anhydride until an exothermic reaction is initiated. The acid is ordinarily dissolved in the fatty composition as a result of the heating. The temperature of the reaction mixture is increased as a result of the exothermic nature of the reaction, and the reaction is then allowed to proceed to completion. The amount of heating necessary to initiate the reaction is dependent upon the reactivity of the acid or anhydride employed, but in general it can be stated that the acids react with the epoxy fatty material more vigorously and at lower temperatures than do the anhydrides.

Epoxy-containing materials applicable in preparing the new polymers of this invention include epoxidized animal, vegetable or marine fatty glycerides and epoxidized fatty acids or derivatives thereof. Examples of suitable oxirane-containing oleaginous compositions are epoxidized cottonseed oil, epoxidized castor oil, epoxidized linseed oil, epoxidized lard oil, epoxidized soybean oil, epoxidized rapeseed oil, epoxidized perilla oil, epoxidized menhaden oil, methyl epoxy stearate and mixtures thereof.

The dibasic acids which may be used to produce the polymers of this invention includes those compounds which contain two acidic hydrogen atoms replaceable by a monovalent metal; or an acid which furnishes two hydrogen ions in aqueous solution. Examples of organic dicarboxylic acids coming within the scope of this invention are maleic, fumaric, oxalic, malonic, succinic, malic, glutaric, adipic, pimelic, suberic, azelaic, sebacic, phthalic, diglycollic, and tartaric acids.

Inorganic di- and tri-basic acids include boric acid, sulphuric acid and phosphoric acid as well as compositions such as benzene di-sulphonic acid and monoalkyl phosphoric acids can be employed in the process. Polybasic carboxylic acids which are satisfactory in carrying out the preparation of the polyester polymers include citric acid, aconitic acid, tricarballylic acid and prehnitic acid.

Equally valuable as agents for achieving fracture of the oxirane ring are the acid anhydrides. Cyclic anhydrides such as maleic anhydride, phthalic anhydride, tetrachlorophthalic anhydride, tetrahydrophthalic anhydride 1,3 cyclopentanedicarboxylic acid anhydride, citraconic anhydride, and vinyl methyl ether-maleic anhydride copolymer may also be employed. Other useful cyclic anhydrides may be derived from boric acid. The trialkoxy boroxines are representative of this type of cyclic anhydride. Trimethoxy boroxine has been employed in the process of the present invention with substantial success.

In accordance with the method of this invention, breaking of the oxirane configuration and linking of molecules through the bond resulting from ring fracture results in the production of linear or cross-linked polyesters. Linear polyesters are produced when an epoxidized fatty material containing an average of not more than one epoxy group per molecule is reacted with a dibasic acid anhydride. A linear polymer may also be produced by the reaction between a dibasic acid and an epoxidized fatty material containing an average of not more than two epoxy groups per molecule. The term "linear polymers" or "linear polyesters" as used herein is intended to define those products formed in accordance with this invention in which the linkage between polymer chains, if such linkage exists, is insufficient to render the product insoluble in organic solvents such as ethers, halogenated hydrocarbons, etc.

Cross-linked polymers which are three dimensional in configuration and which demonstrate an increased resistance to melting at high temperature and are resistant to the effect of solvents may be produced by a proper selection of reactants. Dibasic acids will produce cross-linked products provided the epoxy fatty material with which these dibasic acids are reacted contains an average of more than two epoxy groups per molecule. Dibasic acid anhydrides, on the other hand, cause cross-linking in fatty materials containing an average of about two epoxy groups per molecule. Polyepoxy fatty materials which contain an average of more than two epoxy groups per molecule thus form cross-linked products with either dibasic acids or dibasic acid anhydrides. The following skeletal formula shows the ester linkage between glyceride molecules containing a plurality of epoxy groups such as triepoxy stearin which has been reacted with a dibasic acid such as maleic acid.

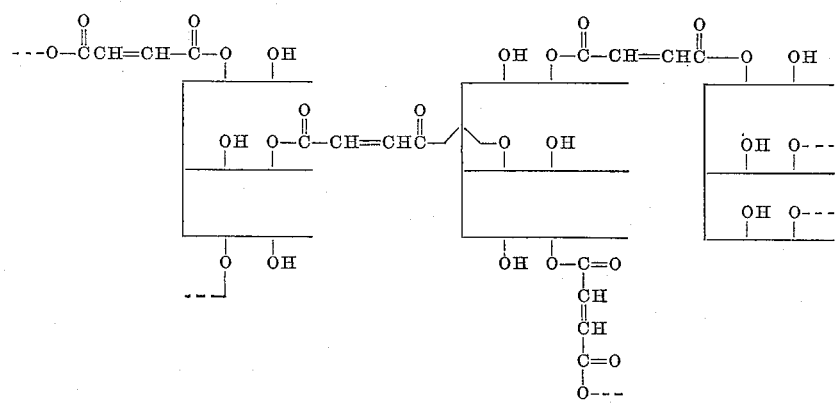

The reaction with acids containing more than two acid groups to form cross-linked products is also contemplated. Tribasic acids such as citric acid form cross-linked products with epoxidized fatty materials containing an average of more than about 1.5 epoxy groups per molecule and tetrabasic acids form cross-linked products with epoxidized fatty materials containing an average of more than about 1.33 epoxy groups per molecule.

The invention is further illustrated by the following examples, which are included only for purposes of illustration and are to be considered in no way limitative of the invention:

*Example I*

A mixture of 320 grams (1 mole) of methyl epoxystearate and 1 mole (164 grams) endo-cis-bicyclo(2.21)-5-heptene-2.3-dicarboxylic acid anhydride (commercially available as "Nadic Anhydride") was heated until an exothermic reaction was initiated (about 130° C.). The temperature was then increased to about 150° C. and the reaction mixture was maintained at this temperature for about four hours. The viscosity of the mixture increased markedly even while still hot, and, upon cooling, a tacky rubbery gel was obtained. The gel was soluble in such solvents as benzene, chloroform, and diethyl ether. The product had an acid number of 23, Sap. No. 390, and a negligible oxirane content. The soluble polymer is useful as an additive for flexible alkyd resins.

*Example II*

A mixture of about 6.0 grams (0.05 mole) of finely ground maleic acid and about 30 grams of soybean oil containing 0.1 equivalent of epoxide was heated to dissolve the acid in the oil. The mixture was further heated until an exothermic reaction was initiated (about 130° C.). The temperature of the mixture increased still further and the mixture became much more viscous, finally setting to a clear, flexible, slightly tacky solid. The product sticks tenaciously to glass surfaces, and adheres to itself. The polymer was insoluble in organic solvents, but could be reacted with hot alkali on prolonged treatment.

*Example III*

A mixture of about 7.3 grams (0.05 mole) of adipic acid and about 30 grams of epoxidized soybean oil containing an epoxy equivalent of about 0.1 was heated to about 130° C. to dissolve the acid in the oil. Further heating was required to start the exothermic reaction, and after heating at between 150° C. to 180° C. for about 4 hours, the mixture solidified to form a flexible resin.

*Example IV*

In order to show the reaction between an hydroxyl-containing polycarboxylic acid and an epoxy-containing fatty material, citric acid was reacted with epoxidized soybean oil. Seven grams of citric acid dissolved in 10 grams of butyl Cellosolve was mixed with 30 grams of epoxidized soybean oil and the mixture was heated to a temperature of about 170° C. After about 2 hours heating at this temperature, the mixture was cooled, and a friable rubbery polymer remained.

*Example V*

About 30 grams of epoxidized soybean oil containing 0.1 epoxy equivalent was heated with about 10 grams (0.05 mole) of thiodipropionic acid at about 130° C. The acid had become dissolved in the oil, but further heating in the range of 150° C. to 180° C. for about one-half hour or more was required to initiate the exothermic reaction which, upon completion, resulted in a rubbery polymer.

*Example VI*

A mixture of 21.6 grams of epoxidized linseed oil and 14.8 grams of phthalic anhydride was heated to a temperature of about 130° C., at which point the anhydride dissolved in the epoxidized oil. Heating was continued until a temperature of about 150° C. was reached, at which point a mild exothermic reaction took place, the viscosity of the mixture increased markedly, and the temperature rose to about 155° C. The temperature of the mixture was maintained at 160° C. for about 5 hours to produce a transparent hard, tough solid.

In Examples VII through X which follow, polymers formed through the use of an inorganic acid as the cross-linking agent are illustrated. These products, unlike those prepared with an organic acid or an organic acid anhydride, are somewhat unstable, decomposing to a sticky, tacky paste after several weeks or months. Heating can be employed to speed up the decomposition. These inorganic ester polymers may be employed in plastic and rubber formulations, providing a stabilizer is also included in the formulation. In addition, these unstable products find use in the crystallization of salts or in fertilizers or insecticides where slow decomposition is often advantageous.

*Example VII*

A mixture of 10 grams epoxidized soybean oil and 1 gram of boric acid were heated to 100–120° C., at which point vapor evolved, indicating that possibly the boric acid was undergoing dehydration. Heating was continued until, about 150–160° C., the acid quickly went into solution, and at about 180° C. a vigorous exothermic reaction occurred. The viscosity of the mixture increased noticeably and the reaction mixture finally set to a rubbery, factice-like solid mass. This polymer, unlike the majority of those prepared using inorganic acids as the cross-linking agent, appears to be quite stable.

*Example VIII*

About 10 cc. of 50 percent sulfuric acid was added to about 50 cc. of epoxidized soybean oil. The temperature rose from about 25° C. to 41° C., and the mixture, which at the outset was an emulsion, formed a rubbery, non-tacky solid within a few minutes. Although the solid which is formed appears to be a polysulfate, it is quite unstable, decomposing to give an alkali soluble oil upon heating to about 100° C. or upon standing for several days at room temperature.

Example IX

The polyphosphate ester is prepared by admixing epoxidized soybean oil with about 10 to 12 percent, based on the weight of the soybean oil, of 85 percent phosphoric acid. The temperature of the mixture increases spontaneously from room temperature, and the mixture finally sets to a flexible but friable solid. If the proportion of phosphoric acid is increased to about 18 percent, a more tacky solid and a small amount of oil are formed. Although anhydrous phosphoric acid may be employed as a substitute for 85 percent phosphoric acid, control of the reaction is much more difficult since the reaction is so vigorous that thorough mixing is not easily achieved and some charring may take place.

An additional sub-class of cross-linking agents which may be employed in accordance with the method of this invention are the trialkoxy boroxines. These compounds may be prepared by reacting a trialkyl borate with boric acid. In this manner, trimethoxy boroxine, tri-n-butoxy boroxine, and tri-iso-octoxy boroxine have been prepared for use as the cross-linking agent.

Example X 100 grams of epoxidized linseed oil (oxirane oxygen=7.7%) was mixed with 10 grams of trimethoxy boroxine and the mixture was vigorously agitated. Although this quantity of trimethoxy boroxine is only about one-half the amount which would theoretically be required, a smaller amount is employed to modify the reaction and guard against decomposition. After stirring for about two to three minutes, the temperature of the reaction mixture rises and the viscosity increases. The stirring is stopped and the reaction is permitted to proceed. The temperature rapidly rises to about 150° C. The reaction product is a tough, hard transparent solid product. The hardness of the product, as recorded on the Shore durometer (Model A–2) is in excess of 95.

From the foregoing, it can be seen that there is disclosed herein a method whereby a variety of valuable polymeric products may be prepared by scission of the epoxy configuration in epoxidized fatty materials, and polymers having diverse physical properties may be provided by a proper selection of the epoxidized fatty material and the cross-linking agent.

Obviously, many modifications and variations of the invention as hereinbefore set forth may be made without departing from the spirit and scope thereof, and, therefore, only such limitations are to be imposed as are indicated in the appended claims.

We claim:
1. A method for preparing cross-linked polyesters comprising: heating and reacting an epoxy-containing fatty material having an average of more than 2 oxirane groups in internal open-chain portion of the fatty molecule with a stoichiometric amount of a trialkoxy boroxine.
2. A polyester polymer of an epoxidized glyceride and trialkoxy boroxines, said polymer being formed by breaking the oxirane ring of said glyceride.
3. A cross linked polymer from epoxidized soybean oil and trimethoxy boroxine.
4. A cross-linked polymer comprising the reaction product of epoxidized linseed oil and a trialkoxy boroxine.
5. A cross-linked polymer from epoxidized linseed oil and trimethoxy boroxine.

References Cited in the file of this patent

UNITED STATES PATENTS

| | | |
|---|---|---|
| 2,185,967 | Priester | Jan. 2, 1940 |
| 2,343,433 | Wells | Mar. 7, 1944 |
| 2,386,250 | McNally et al. | Oct. 9, 1945 |
| 2,396,129 | Rodman | Mar. 5, 1946 |
| 2,403,345 | De Groote et al. | July 2, 1946 |
| 2,613,157 | Knight | Oct. 7, 1952 |
| 2,682,514 | Newey | June 29, 1954 |
| 2,682,515 | Naps | June 29, 1954 |
| 2,732,367 | Shokal | Jan. 24, 1956 |
| 2,752,376 | Julian et al. | June 26, 1956 |
| 2,768,153 | Shokal | Oct. 23, 1956 |
| 2,886,472 | Condo et al. | May 12, 1959 |

FOREIGN PATENTS

| | | |
|---|---|---|
| 565,432 | Great Britain | Nov. 10, 1944 |